US008538617B2

(12) United States Patent
Atluri et al.

(10) Patent No.: US 8,538,617 B2
(45) Date of Patent: Sep. 17, 2013

(54) MODE SELECTION TECHNIQUE FOR ONBOARD ENERGY MANAGEMENT

(75) Inventors: Venkata Prasad Atluri, Ann Arbor, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 116 days.

(21) Appl. No.: 13/160,783

(22) Filed: Jun. 15, 2011

(65) Prior Publication Data
US 2012/0323415 A1 Dec. 20, 2012

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| 6,687,607 | B2 * | 2/2004 | Graf et al. ........................ 701/99 |
| 7,849,944 | B2 * | 12/2010 | DeVault ...................... 180/65.29 |
| 8,099,195 | B2 * | 1/2012 | Imes et al. ..................... 700/278 |
| 8,116,915 | B2 * | 2/2012 | Kempton ....................... 700/291 |
| 2010/0312425 | A1 * | 12/2010 | Obayashi et al. ................ 701/22 |
| 2011/0054710 | A1 * | 3/2011 | Imes et al. ..................... 700/286 |
| 2013/0009486 | A1 * | 1/2013 | Morimoto ....................... 307/82 |

OTHER PUBLICATIONS

Koji Ikeda, et al., Solar Ventilation and Remote Air Conditioning Systems, Toyota Technical Review, vol. 57 No. 1, Jul. 2010, pp. 35-39.

* cited by examiner

*Primary Examiner* — Mary Cheung
*Assistant Examiner* — Frederick Brushaber

(57) ABSTRACT

An auxiliary energy management system for a vehicle includes an energy storage device, solar panel array, a pre-conditioning device, a communication module and a solar control module. The solar panel array generates electrical energy. The pre-conditioning device generates a temperature change to the vehicle. The solar control module includes a processor for selectively configuring a distribution of electrical energy captured by the solar energy panel to one of the energy storage device and the preconditioning device. The processor includes a mode selector logic module for indicating one of a passive enablement or active enablement of the distribution of electrical energy based on a vehicle driving status and the electrical energy availability from the solar panel array. At least one of a recharging function or a preconditioning function is enabled passively or actively based on a configuration in the mode selector logic module or a personalized configuration.

22 Claims, 1 Drawing Sheet

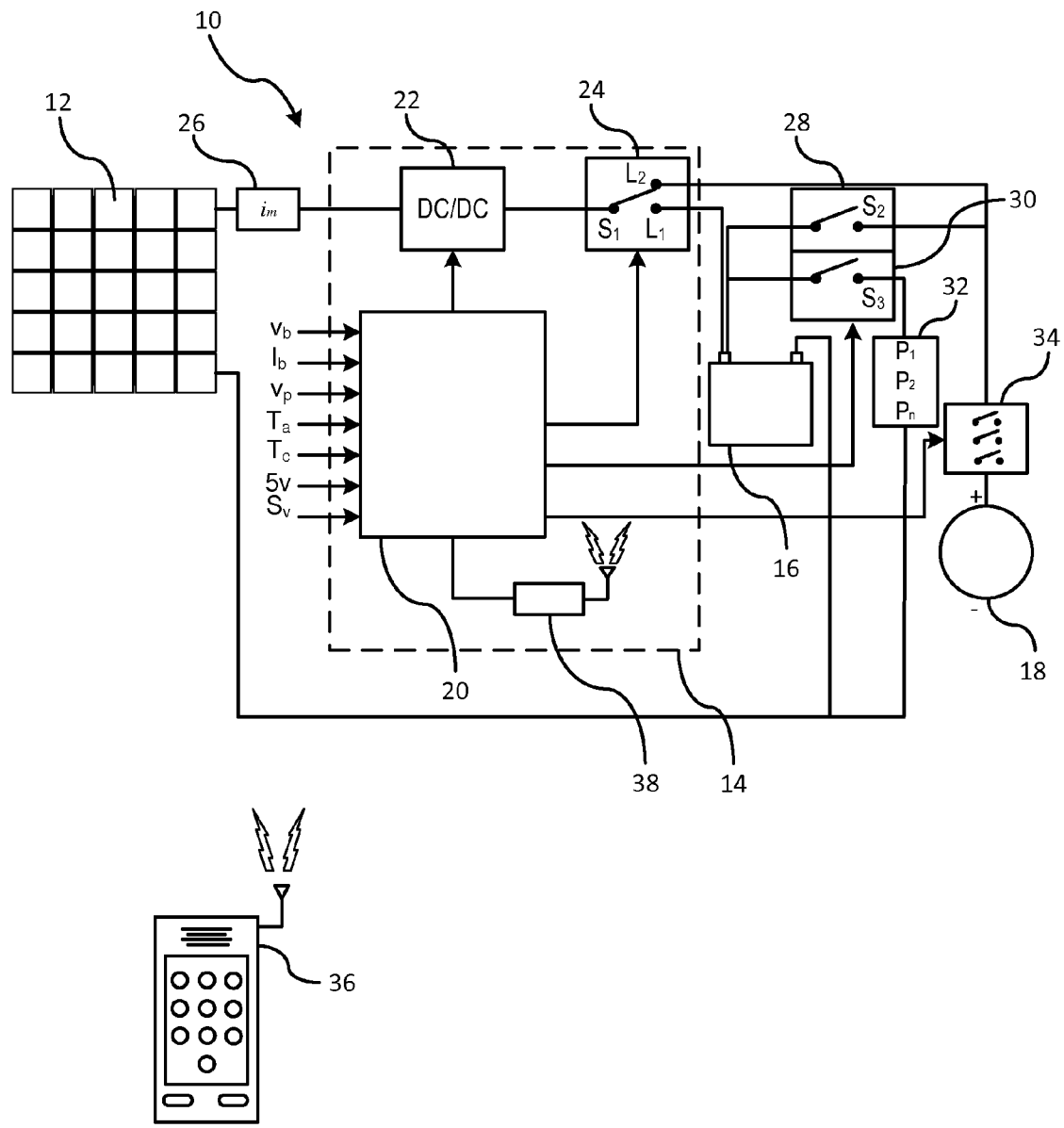

MODE SELECTION TECHNIQUE FOR ONBOARD ENERGY MANAGEMENT

BACKGROUND OF INVENTION

An embodiment relates generally to vehicular energy management.

Vehicles electrical systems are becoming increasingly burdened by the increasing implementation of devices that draw electrical loads from the vehicle battery. Some devices constantly draw power from the vehicle even when the vehicle is parked. Therefore, certain vehicle operations such as cooling a vehicle interior passenger compartment or warming an engine block may not be feasible as the power draw from vehicle devices to perform such operations may draw too much power from the vehicle battery which could leave the battery drained and unable to start the engine. Alternative energy sources such as solar energy may be used, however, solar energy generated is typically used to solely power on e particular load device or go unused. This results in inefficiencies and unused energy.

It would be beneficial to have an auxiliary power supply that could be configured selectively for use or stored if the energy is unused.

SUMMARY OF INVENTION

An advantage of an embodiment is use of solar energy captured by a solar panel array for energizing a preconditioning device and/or recharging an energy storage device. The recharging of the energy storage device or preconditioning device used to modify a threshold temperature of the vehicle may be enabled passively or actively. A remote device may be used to actively enable a preconditioning function. Moreover, the remote device may be used to configure parameters in a mode selector module that indicates when to passively enable preconditioning devices or to passively enable a recharging of the energy storage device.

An embodiment contemplates an energy management system for a vehicle that includes an energy storage device, a solar panel array for generating electrical energy, a pre-conditioning device for generating a temperature change to the vehicle, and a solar control module. The solar control module includes a processor for selectively configuring a distribution of electrical energy captured by the solar energy panel to one of the energy storage device and the preconditioning device. The processor includes a mode selector logic module for indicating one of a passive enablement mode or active enablement mode of the distribution of electrical energy based on a vehicle driving status and the electrical energy availability from the solar panel array. At least one of a recharging function or a preconditioning function is enabled passively or actively based on a configuration in the mode selector logic module.

BRIEF DESCRIPTION OF DRAWINGS

FIG. 1 is a block diagram of an auxiliary energy management system.

DETAILED DESCRIPTION

There is shown in FIG. 1 an auxiliary energy management system 10 for selectively controlling electrical energy supplied to various components of a vehicle. The system 10 includes a solar panel array 12 that is coupled to a solar control module 14 for distributing electrical energy to either an energy storage device 16 or to a preconditioning device such as an electric motor 18 (e.g., HVAC blower motor). It should be understood that the preconditioning device is not limited to a blower motor, but can include any propulsion system component.

The solar panel array 12 includes an array of panels made up of solar cells. The panels are interlinked, typically in series, so that voltage is additive and a desired voltage output can be achieved. The solar energy captured by the solar panel array 12 excites electrons in the solar cells for generating electricity. The electricity generated by the solar panel array 12 is in the form of direct current (DC).

The solar control module 14 includes a processor 20, a DC/DC converter 22, and a switch 24. The DC/DC converter 22 is coupled between the solar panel array 12 and the switch 24. The DC/DC converter 22 converts either a low voltage DC generated by the solar panel array 12 into a high voltage DC or a high voltage DC generated by the solar panel array 12 into a low voltage DC. A current measuring device 26 may be coupled between the solar panel array 12 and the DC/DC converter 22, for monitoring the current flow from the solar panel array 12.

The switch 24 selectively couples the solar panel array 12 through the DC/DC converter 22 to either the energy storage device 16 or the motor 18. Coupling the solar panel array 12 to the energy storage device 16 is referred to as a recharging function, whereas coupling the solar panel array 12 to a preconditioning device, such as the motor 18, is referred to as a pre-conditioning function.

The pre-conditioning mode includes applying energy to a preconditioning device to precondition (i.e., modify) a temperature of the passenger compartment or a component of the vehicle. For example, a passenger compartment of a vehicle may be pre-conditioned (e.g., cooled) when parked by using the motor 18 energized with electrical energy generated by the solar panel array 12 when respective conditions are present. Other pre-conditioning devices may include, but are not limited to a pre-heater, such a heating device for an engine block or a three way catalyst.

Recharging function includes recharging the energy storage device 16 using electrical energy generated by the solar panel array 12 when other predetermined conditions are present. If the vehicle is parked and solar energy is being generated by the solar panel array 16, then recharging function may be enabled.

The processor 20 regulates the position of the switch 24 based on a plurality of conditions. The plurality of the conditions includes, but is not limited to, vehicle status (e.g., driving or parked), solar energy availability, battery voltage, and a temperature differential between the cabin temperature of the vehicle and exterior ambient temperature. The processor 20 also monitors the load demands of various vehicle components. Based on the load demands, the processor 20 may actuate the switch 28 to supply energy to the motor 18 from the energy storage device 16. The processor 20 may also actuate the switch 30 to distribute energy to a pre-conditioning unit 32 from the energy storage device 16. If the loads are at a demand level where neither the energy from the solar panel array 12 nor the energy storage device 16 can individually supply an adequate amount of energy to one or more vehicle components, such as the blower motor, then the energy from the solar panel array 12 and the energy storage device 16 may be cooperatively used to energize the one or more of the vehicle components.

The processor 20 utilizes a high level mode selector logic module as shown in Table 1 below for determining whether the recharging function or the pre-conditioning mode should be enabled based on a vehicle driving status and solar power availability.

TABLE 1

| Vehicle Status | Solar Power | Enablement Mode |
|---|---|---|
| 1 | 1 | Active |
| 0 | 1 | Passive |
| 1 | 0 | Sleep |
| 0 | 0 | Sleep |

The vehicle status as illustrated in the Table 1 designates whether the vehicle is driving or parked. A "1" designated in the vehicle status field indicates that the vehicle is being driven. A "0" designated in the vehicle status field indicates that the vehicle is parked.

In reference to the solar power status, a "1" in the solar power field indicates that the solar radiation from the sun is currently being captured by the solar panel array 12 and electrical energy is available for distribution from the solar panel array 12. A "0" designated in the solar panel field indicates that solar power is not currently available from the solar panel array 12.

Based on the combined vehicle status and solar power status, recharging functions and/or preconditioning functions are enabled actively or passively.

As illustrated in the first row of Table 1, active enablement occurs when the vehicle is being driven and solar energy is available from the solar panel array 12. This is designated by a "1" in both the vehicle status field and the solar power field. In active enablement, power is cooperatively supplied by both the solar panel array 12 to recharge the energy storage device 1, and power is supplied by the energy storage device 16 to energize the electric motor 18.

As illustrated in the second row of Table 1, passive enablement occurs when the vehicle is parked and when solar energy is available from the solar panel array 12. This is designated by a "0" in the vehicle status field and a "1" in the solar power field. In passive enablement, power is supplied by the solar panel array 12 to either recharge the energy storage device 16 or that power may be used to precondition a component or a vehicle compartment.

As illustrated in the third and fourth row of Table 1, sleep enablement mode occurs whenever solar energy from the solar panel array 12 is unavailable.

Referring to passive enablement mode, the determination for passively enabling a recharging function or a preconditioning function depends on the temperature of the interior passenger compartment of the vehicle, power demand loads, and the voltage level of the vehicle energy storage device. Table 2 illustrates the switch configurations for enablement of respective functions when in passive enablement mode. The switch configurations are based on temperature status and level of voltage in the energy storage device 16.

TABLE 2

| Battery | Temp | S1L1 | S1L2 | S2 | Function |
|---|---|---|---|---|---|
| Vbat > Max | >Tref | 1 | 0 | 0 | Blower ON |
| Vbat > Max | <Tref | 0 | 0 | 0 | Sleep mode |
| Mid < Vbat < Max | <Tref | 0 | 1 | 0 | Trickle charge battery (Float Charge) |
| Mid < Vbat < Max | >Tref | 1 | 0 | 0 | Blower ON |
| Min < Vbat < Mid | >Tref | 1 | 0 | 0 | Blower ON |
| Min < Vbat < Mid | <Tref | 0 | 1 | 0 | Charge battery (Bulk Charge) |

The configuration of switch 24 and 28 is actuated accordingly based on the voltage level in the energy storage device (e.g., battery) and temperature of the interior passenger compartment.

For the voltage criteria illustrated in the first column of Table 2, the voltage level of the energy storage device 16 is compared to predetermined voltage thresholds. For example, the battery voltage $V_{bat}$ is compared with three battery voltage ranges. The three battery voltage ranges include, but are not limited to, $V_{bat}$>Max value, Mid value<$V_{bat}$<Max value, and Min value<$V_{bat}$<Mid value. Then battery voltage range is selected based on which range the battery voltage $V_{bat}$ is disposed.

For the temperature criteria, as illustrated by the second column in Table 2, the temperature of the interior passenger compartment $T_c$ is subtracted from an ambient outside temperature $T_a$ (e.g., exterior temperature of the vehicle) for generating a temperature differential. The temperature differential is compared to a reference temperature $T_{ref}$.

The resulting combination from the battery voltage criteria and the temperature criteria determines the configuration of switches 24 and 28 for passively activating the recharging function and the preconditioning function.

Referring again to Table 2, and more specifically to the first row of Table 2, if the battery voltage is greater than a maximum voltage and the temperature differential is greater than a temperature reference, the following switches are configured for enabling the blower motor for preconditioning the passenger compartment: switch 24 is configured to close S1L1 and open S1L2, and the switch 28 is open.

Referring to the second row in the Table 2, if the battery voltage is greater than a maximum voltage and the temperature differential is less than a temperature reference, then the following switches are configured for maintaining a sleep mode wherein no preconditioning is enabled: switch 24 is configured to open S1L1 and S1L2, and open switch 28.

Referring to the third row in the Table 2, if the battery voltage is between a mid voltage and a maximum voltage, and the temperature differential is less than a temperature reference, then the following switches are configured for applying a trickle charge to the vehicle battery: switch 24 is configured to open S1L1 and close S1L2, and the open switch 28.

Referring to the fourth row in the Table 2, if the battery voltage is between a mid voltage and a maximum voltage, and the temperature differential is greater than a temperature reference, then the following switches are configured for enabling the blower motor for preconditioning the passenger compartment: switch 24 is configured to close S1L1 and open S1L2, and the open switch 28.

Referring to the fifth row in the Table 2, if the battery voltage is between a minimum voltage and a mid voltage, and the temperature differential is greater than a temperature reference, then the following switches are configured for enabling the blower motor for preconditioning the passenger compartment: switch 24 is configured to close S1L1 and open S1L2, and to open switch 28.

Referring to the sixth row in the Table 2, if the battery voltage is between a minimum voltage and a mid voltage, and the temperature differential is less than a temperature reference, then the following switches are configured for enabling the blower motor for applying a trickle charge to the vehicle battery: switch 24 is configured to open S1L1 and close S1L2, and to open switch 28.

It should be understood that the above examples of switch configurations are only exemplary, and that other switch configurations can be implemented. Moreover, other vehicle components can be preconditioned in addition to the passenger compartment. Such preconditioning may be performed individually or concurrently depending upon the available energy stored in the generated by the solar panel array 12 and energy storage device 16. It should also be understood that the schematic shown in FIG. 1 may include more or less preconditioning devices as shown, and more or less switches to accommodate the enabling and disabling of the preconditioning devices.

The processor 20 includes a plurality of inputs from various monitoring devices which are used to selectively distribute electrical energy to various components of a vehicle for enabling a preconditioning function such as those shown in Table 2 which is based on the load demands, energy stored in the energy storage device 16, and energy generated by the solar panel array 12. The various inputs include, but are not limited to, battery voltage ($V_b$), battery current ($I_b$), solar panel voltage ($V_b$), ambient temperature ($T_a$), passenger compartment temperature ($T_c$), a reference voltage (5 v), and a vehicle status ($S_v$) that indicates whether the vehicle is in a drive mode or a park mode.

The processor 20 is coupled to the plurality of switches by control signal lines for controlling the actuation of the switches for recharging the energy storage device 16 and/or enabling a preconditioning device by electrical energy supplied by the energy storage device 14 and/or solar power array 12. In addition, the processor 20 may provide a pulse switch modulation signal to a switch bank 34 of the motor for controlling a speed of the motor 18.

A remote device 36 is preferably a wireless transmitting device in communication with a communication module 38 of the vehicle for actively enabling a preconditioning function or changing parameters for passively enabling a preconditioning function. Such remote devices may include smartphones, computers, personal digital assistant (PDA) and any other device that is capable of transmitting a signal to the vehicle so that the auxiliary power management system 10 can activate or reconfigure parameters for enabling preconditioning functions. Remote devices such as smartphones are preferred so that the smartphone can communicate with the vehicle from far distances in comparison to devices with low frequency transmitters; however, devices with low frequency transmitters may used. The communication module 38 may be integrated as part of the auxiliary power management system 10, or more specifically, the solar control module 14. The communication module 38 may also be a non-integrated module such as OnStar®, that is currently provided by vehicle manufacturers on vehicles. This service is typically used to provide in-vehicle security, remote diagnostics systems, and turn-by-turn navigation through a wireless communication system, but can be configured to reconfigure preconditioning parameters of the auxiliary power management system 10. The remote device 36 communicates with the communication module 38 for receiving commands by a user of the remote device 36 for actuating a respective function or for reconfiguring a parameter used to passively enable a pre-conditioning function.

In an active enablement mode for a preconditioning function, the user of the vehicle actively enables a preconditioning function. Active enablement of a preconditioning function is where the user of the vehicle will use the vehicle within a short period of time (e.g. 10 minutes) and may actively enable a preconditioning function (e.g., blower motor) via the remote device 36 to cool the interior of the vehicle prior to the user entering the vehicle. As a result, power is provided by the solar panel array 12 and/or the energy storage device 14 depending on the loads demanded by the preconditioning devices and available energy from each energy source.

In a passive enablement mode, a preconditioning function is enabled when predetermined conditions are satisfied. For example, a preconditioning function may be enabled whenever the passenger compartment temperature $T_c$ is above a predetermined threshold in relation to the outside ambient temperature $T_a$. A user can pre-configure the reference temperature $T_{ref}$ for comparison the temperature differential as described earlier. Moreover, the auxiliary power management system 10 can be configured by the user so that a preconditioning function occurs when the passenger compartment temperature $T_c$ is above a user configured reference temperature as opposed to performing a temperature differential. Moreover, if a user has a set schedule as to when the vehicle is driven, the user can configure that the preconditioning function to occur at a respective time. For example, if a user departs from work at a respective time each day, the time may be set for the preconditioning function to occur at a set time prior to the user departing work. As a result, the reference temperature in Table 2 is configurable by the user, in addition to any time stamps that are set for enabling preconditioning devices from either the remote device or from within the vehicle. The predetermined parameters are analyzed in accordance with the Table 2 for determining whether a preconditioning function should be passively enabled, in addition to determining what energy source may be used to power a preconditioning device. It should be understood that parameters other than those described herein may be used to configure the enablement of the predetermined operations.

While certain embodiments of the present invention have been described in detail, those familiar with the art to which this invention relates will recognize various alternative designs and embodiments for practicing the invention as defined by the following claims.

What is claimed is:

1. An energy management system for a vehicle comprising:
   an energy storage device;
   a pre-conditioning device for generating a temperature change to the vehicle;
   a solar panel array for generating electrical energy, the solar panel array selectively coupled to the energy storage device and selectively coupled to the preconditioning device;
   a solar control module including a processor for selectively configuring a distribution of electrical energy captured by the solar energy panel to one of the energy storage device and the preconditioning device, the solar control module configured to operate between a passive enablement mode and an active enablement mode, the processor including a mode selector logic module for indicating one of the passive enablement mode or active enablement mode of the distribution of electrical energy based on a vehicle driving status and the electrical energy availability from the solar panel array, wherein at least one of a recharging function or a preconditioning function is enabled passively or actively based on a configuration in the mode selector logic module.

2. The energy management system of claim 1 further comprising a first switch controlled by the processor that is selectively actuated for distributing electrical energy captured by the solar panel array to one of the preconditioning device or the energy storage device.

3. The energy management system of claim 2 wherein the configuration of the first switch is based on a function of a temperature inside a vehicle passenger compartment and a level of charge stored in the energy storage device.

4. The energy management system of claim 3 wherein the configuration of the first switch is a function of a temperature differential and a reference temperature, the temperature differential being a difference between the temperature of the vehicle passenger compartment and an ambient temperature exterior of the vehicle.

5. The energy management system of claim 4 wherein the configuration of the first switch is a function of a level of voltage in the energy storage device and a plurality of voltage thresholds, wherein the plurality of voltage thresholds are ranges for identifying a relative level of charge in the energy storage device.

6. The energy management system of claim 5 wherein the recharging function is enabled when the voltage level of the battery is below a maximum voltage threshold when in passive enablement mode.

7. The energy management system of claim 6 wherein a sleep mode is enabled when the voltage level of the battery is above the maximum voltage threshold and the temperature differential is less than the reference temperature when in passive enablement.

8. The energy management system of claim 4 wherein the preconditioning device is a blower motor.

9. The energy management system of claim 8 wherein the blower motor is passively enabled when the temperature differential is greater than the reference temperature.

10. The energy management system of claim 4 further comprising a portable device for communicating with the vehicle, wherein the portable device is used to remotely reconfigure the reference temperature for passive enablement of the distribution of electrical energy.

11. The energy management system of claim 10 wherein the portable device is used to remotely configure a time at which a preconditioning function is passively enabled.

12. The energy management system of claim 2 further comprising a portable device for wirelessly communicating with the vehicle, the portable device selectively communicating a command to actively actuate the enablement of electrical energy to the preconditioning device.

13. The energy management system of claim 12 further comprising a communication module on the vehicle in communication with the solar control module, wherein the communication module is in further communication with the portable device, wherein the portable communication device remotely reconfigures parameters for passively enabling the preconditioning function via the communication module.

14. The energy management system of claim 13 wherein the communication module is integrated with the solar control module.

15. The energy management system of claim 13 wherein the communication module is remote from the solar control module within the vehicle.

16. The energy management system of claim 2 further comprising a second switch controlled by the processor that is selectively actuated for distributing electrical energy from the energy storage device to the preconditioning device.

17. The energy management system of claim 16 wherein the processor controls the first switch and the second switch for selectively energizing the precondition device utilizing the electrical energy generated by the solar panel and electrical energy stored in the energy storage device.

18. The energy management system of claim 17 further comprising a third switch and a preheating device, wherein the third switch is controlled by the processor, and wherein the third switch is selectively actuated for distributing electrical energy from the energy storage device to the preheating device.

19. The energy management system of claim 1 wherein the processor monitors the vehicle driving status and solar energy availability for enabling the recharging function and preconditioning function.

20. The energy management system of claim 19 wherein the recharging function and preconditioning function are enabled concurrently.

21. The energy management system of claim 19 wherein the recharging function and preconditioning function are enabled individually.

22. The energy management system of claim 1 wherein the processor monitors the vehicle driving status and solar energy availability for enabling a sleep mode, wherein sleep mode is enabled when solar energy is unavailable from the solar panel array.

* * * * *